No. 690,174. Patented Dec. 31, 1901.
M. M. MÜLLER.
SCRAPER.
(Application filed Jan. 21, 1901.)
(No Model.)
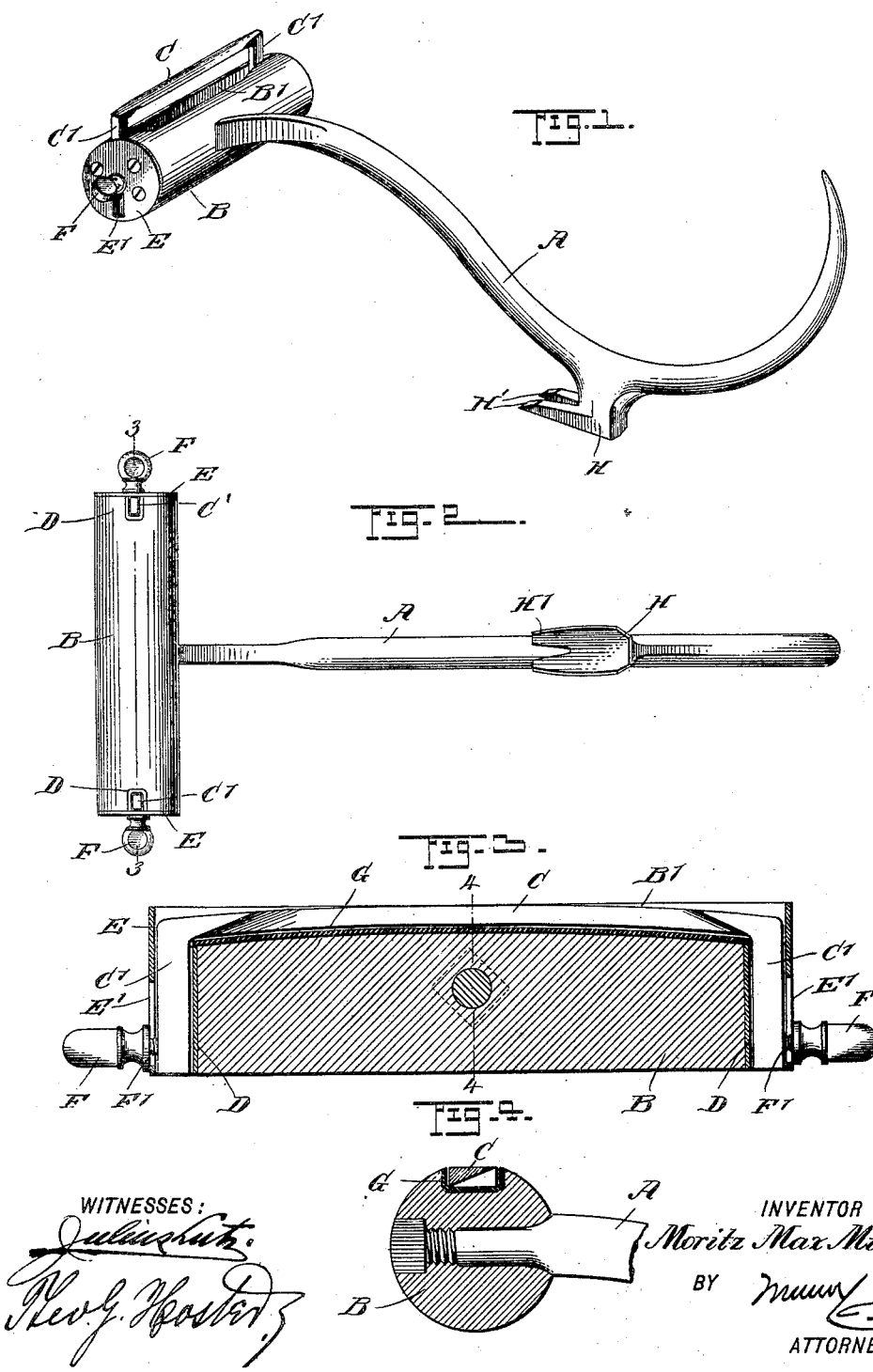
WITNESSES:
INVENTOR
Moritz Max Müller.
BY
ATTORNEYS

UNITED STATES PATENT OFFICE.

MORITZ MAX MÜLLER, OF NEW YORK, N. Y., ASSIGNOR TO ALOIS OSTERKORN, OF NEW YORK, N. Y.

SCRAPER.

SPECIFICATION forming part of Letters Patent No. 690,174, dated December 31, 1901.

Application filed January 21, 1901. Serial No. 44,100. (No model.)

*To all whom it may concern:*

Be it known that I, MORITZ MAX MÜLLER, a subject of the King of Saxony, residing in the city of New York, borough of the Bronx, in the county and State of New York, have invented a new and Improved Scraper, of which the following is a full, clear, and exact description.

The object of the invention is to provide a new and improved tool arranged to permit of scraping printed, stamped, and other matter from boxes and other packages.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is an inverted plan view of the same. Fig. 3 is an enlarged transverse section of the same on the line 3 3 in Fig. 2, and Fig. 4 is a sectional side elevation of the same on the line 4 4 in Fig. 3.

The improved tool consists, essentially, of a hook A, having its shank attached to a transversely-extending handle B, formed with a recess B' for receiving a scraper C, extending transversely and formed at its ends with arms C', fitted to slide in guideways D, set diametrically in the ends of the handle B, as is plainly illustrated in the drawings. The guideways D are closed by end plates or caps E, screwed or otherwise fastened to the ends of the handle B, and said plates are formed with elongated slots E', through which extend the threaded shanks F' of clamping-screws F, the shanks screwing in the arms C' and the heads extending outside of the plates E to clamp the same upon screwing the screws inward to securely lock the scraper C in either a projected position, as shown in Fig. 1, or in a folded position, as illustrated in Fig. 3. It is understood that by slightly unscrewing the screw F the operator by pushing on the heads of the screws can move the scraper C into a projected position, as shown in Fig. 1, or into a concealed position, as shown in Fig. 3, the scraper then lying with its cutting-edge portion within the recess B'. The latter is preferably formed with a lining G, of rubber or other suitable material, for preventing injury to the cutting edge of the scraper. When the scraper C is concealed in the handle B, then the tool can be used in the usual manner for handling bales, boxes, or other packages by the operator taking hold of the handle and wielding the tool in the legitimate way.

When it is desired to use the tool for scraping off addresses or other printed or stamped matter from the boxes, then the operator slightly unscrews the screws F and pushes the same so as to move the scraper C into a projected position, as shown in Fig. 1, and by then screwing up the screws the scraper is locked in the extended position. The operator now takes hold of the shank of the hook A and uses the tool to scrape the box with the cutting edge of the scraper C.

On the back of the shank of the hook A is arranged a claw-hammer H, the claws H' of which extend toward the handle B in the direction of the length of the hook-shank, the claws being a distance from the top of the shank, so that when the operator takes hold of the hook-shank for using the tool for scraping purposes at the time the scraper C is projected, the operator can place the forefinger between the claws H' and the shank, to obtain a secure hold on the shank for scraping purposes. The claw-hammer H is also used for its legitimate purposes—that is, for driving or pulling nails to close or open boxes or other packages.

Having thus fully described my invention, I claim as new and desire to secure by Letters Patent—

1. A tool, comprising a shank, a transversely-extending support or holder at one end of the shank and provided with a recess, a scraper adjustably mounted in said recess, plates or caps at the ends of the support or holder, and fastening means extending through the plates or caps and engaging the scraper, as set forth.

2. A tool comprising a support or holder formed with a recess, a scraper arranged in said recess, and formed at its ends with arms fitted to slide in guideways in the ends of the handle, end plates secured to the handle for closing said guideways, the said plates being formed with elongated slots, and clamping-screws having threaded shanks extending through said slots and screwing in the said arms, as set forth.

3. A tool comprising a scraper, a recessed support or holder for the scraper, the scraper being slidably mounted in the support and arranged for projection beyond the surface of the support or for concealment within the same, and a lining for the recess of the support to prevent injury to the cutting edge of the scraper as set forth.

In testimony whereof I have signed my name to this specification in the presence of two subscribing witnesses.

MORITZ MAX MÜLLER.

Witnesses:
THEO. G. HOSTER,
EVERARD BOLTON MARSHALL.